(12) United States Patent
Naganawa

(10) Patent No.: US 10,103,375 B2
(45) Date of Patent: Oct. 16, 2018

(54) FASTENING STRUCTURE

(71) Applicants: GS Yuasa International Ltd., Kyoto-shi (JP); HONDA MOTOR CO., LTD., Tokyo (JP)

(72) Inventor: Nobuyuki Naganawa, Kyoto (JP)

(73) Assignees: GS YUASA INTERNATIONAL LTD., Kyoto-Shi, Kyoto (JP); HONDA MOTOR CO., LTD., Tokyo (JP)

( * ) Notice: Subject to any disclaimer, the term of this patent is extended or adjusted under 35 U.S.C. 154(b) by 844 days.

(21) Appl. No.: 14/405,111

(22) PCT Filed: May 30, 2013

(86) PCT No.: PCT/JP2013/065001
§ 371 (c)(1),
(2) Date: Dec. 2, 2014

(87) PCT Pub. No.: WO2013/190969
PCT Pub. Date: Dec. 27, 2013

(65) Prior Publication Data
US 2015/0171408 A1    Jun. 18, 2015

(30) Foreign Application Priority Data

Jun. 20, 2012 (JP) ................................. 2012-138462

(51) Int. Cl.
*H01M 2/30* (2006.01)
*F16B 35/06* (2006.01)
(Continued)

(52) U.S. Cl.
CPC ............... *H01M 2/30* (2013.01); *F16B 35/06* (2013.01); *F16B 37/064* (2013.01); *H01G 11/74* (2013.01);
(Continued)

(58) Field of Classification Search
CPC ...... F16B 35/06; F16B 37/044; F16B 37/064; F16B 5/025; H01G 11/74; H01G 11/82;
(Continued)

(56) References Cited

U.S. PATENT DOCUMENTS

2010/0040431 A1    2/2010  Suzuki
2011/0092111 A1    4/2011  Tsuchiya et al.
(Continued)

FOREIGN PATENT DOCUMENTS

JP    10-270009 A    10/1998
JP    2008-192595 A    8/2008
(Continued)

OTHER PUBLICATIONS

English Translation of International Preliminary Report on Patentability in PCT No. PCT/JP2013/065001 dated Dec. 31, 2014.
International Search Report (ISR) (PCT Form PCT/ISA/210), in PCT/JP2013/065001, dated Aug. 6, 2013.

*Primary Examiner* — Lingwen R Zeng
(74) *Attorney, Agent, or Firm* — McGinn I.P. Law Group, PLLC.

(57) ABSTRACT

A fastening structure according to the present invention includes a bolt member, a nut member, and an anti-rotation member, wherein one of the bolt member and the nut member is attached so as to permit its displacement toward the other member side, and the one member or the anti-rotation member is formed to allow a maximum engaging width to be reduced as the one member is displaced toward the other member side.

17 Claims, 13 Drawing Sheets

(51) Int. Cl.
*F16B 37/06* (2006.01)
*H01G 11/74* (2013.01)
*H01G 11/82* (2013.01)
*H01R 11/28* (2006.01)
*H01M 2/20* (2006.01)
*F16B 5/02* (2006.01)
*F16B 37/04* (2006.01)

(52) U.S. Cl.
CPC ............ *H01G 11/82* (2013.01); *H01R 11/283* (2013.01); *H01R 11/289* (2013.01); *F16B 5/025* (2013.01); *F16B 37/044* (2013.01); *H01M 2/20* (2013.01); *Y02E 60/13* (2013.01)

(58) Field of Classification Search
CPC ......... H01M 2/20; H01M 2/30; H01R 11/283; H01R 11/289; Y02E 60/13
See application file for complete search history.

(56) References Cited

U.S. PATENT DOCUMENTS

| | | | | |
|---|---|---|---|---|
| 2011/0244317 | A1* | 10/2011 | Lee | H01M 2/0473 429/182 |
| 2012/0160558 | A1* | 6/2012 | Okamoto | H01M 2/04 174/551 |
| 2014/0057135 | A1 | 2/2014 | Okamoto et al. | |

FOREIGN PATENT DOCUMENTS

| | | |
|---|---|---|
| JP | 2009-301874 A | 12/2009 |
| JP | 2010-097764 A | 4/2010 |
| JP | 2010-097822 A | 4/2010 |
| JP | 2012-151098 A | 8/2012 |
| JP | 2010-043720 A | 10/2013 |
| WO | WO 2009/150917 A | 12/2009 |

* cited by examiner

FASTENING STRUCTURE

FIELD

The present invention relates to a fastening structure for fixing an object to be fixed by fastening a bolt member and a nut member.

BACKGROUND

A fastening structure is used in various equipment. The fastening structure is configured to fix an object to be fixed to various equipment by fastening the bolt member and the nut member. For example, a fastening structure in an electric storage device is used for electrical connection with another electric storage device or electric circuit component. In such a fastening structure, a plate member for electrical connection, which is a so-called bus bar, is used as the object to be fixed, for example.

In this case, as an embodiment of a fastening structure that fixes an electrical connection member to another electric storage device or electric circuit component, a technique in which a bolt member and a nut member are fastened, with an electrical connection member interposed between the head of the bolt member and the nut member is widely used, which is disclosed also in Patent Literature 1 below, for example. The bolt member is formed as an electrode terminal in this case.

A configuration in which an anti-rotation member is arranged in a device case is often employed in the fastening operation of the bolt member and the nut member, as disclosed in Patent Literature 1 below. The anti-rotation member prevents rotation of the bolt member with tightening of the nut member.

CITATION LIST

Patent Literature

Patent Literature 1: JP 2010-097764 A

SUMMARY

Technical Problem

As in the configuration of the aforementioned conventional technique, when one of a bolt member and a nut member is prevented from rotating during fastening of the bolt member and the nut member by an engaging action with an anti-rotation member, the fastening operation itself is smoothly performed. However, the components of the electric storage device may possibly be damaged due to the fastening operation.

That is, since the fastening operation of the bolt member and the nut member is smoothly performed, the bolt member and the nut member may be excessively tightened in some cases. This may result in stripped screw threads of the bolt member, or the like, or deformation of the bus bar, or the like, for example.

The present invention has been devised in view of such an actual situation described above, and an object thereof is to provide a fastening structure in which an object to be fixed is easily fixed by a bolt member and a nut member, and the bolt member and the nut member are prevented, as much as possible, from being damaged due to excessive tightening of the bolt member and the nut member.

Solution to Problem

A fastening structure of the present invention includes: a bolt member; a nut member configured to cooperate with the bolt member so as to fix an object to be fixed by being fastened with the bolt member; and an anti-rotation member configured to prevent rotation of one of the bolt member and the nut member about a rotation axis by an engaging action with the one member, wherein the one member is attached so as to permit its displacement toward the other member side following the fastening operation with the other member of the bolt member and the nut member, and the one member or the anti-rotation member is formed to allow a maximum engaging width between the one member and the anti-rotation member in a direction orthogonal to the rotation axis to be reduced as the one member is displaced toward the other member side following the fastening of the bolt member and the nut member.

According to an aspect, the fastening structure of the present invention may have a configuration in which the one member or the anti-rotation member has an engaging portion between the one member and the anti-rotation member that is tapered or formed stepwise so as to be narrowed toward an end in the rotation axis direction, thereby allowing the maximum engaging width to be reduced with the displacement of the one member.

According to another aspect, the fastening structure of the present invention may have a configuration in which the anti-rotation member is fixed to a device case of an electric storage device housing an electric storage element, and the object to be fixed includes an electrical connection member configured to electrically connect the electric storage device to an external component.

In this case, it is preferable that the bolt member and the nut member be fastened, with the electrical connection member and a wiring member that is electrically connected to the electric storage element being interposed, as the object to be fixed, therebetween.

A fastening structure of the present invention includes: a bolt member; a nut member configured to cooperate with the bolt member so as to fix an object to be fixed by being fastened with the bolt member; and an anti-rotation member configured to prevent rotation of one of the bolt member and the nut member about a rotation axis, wherein the one member is attached so as to permit its displacement toward the other member side following the fastening operation with the other member of the bolt member and the nut member, the one member and the anti-rotation member have engaging portions configured to engage each other, and one of the engaging portions of the one member and the anti-rotation member is formed to be narrowed toward the other member of the engaging portions of the one member and the anti-rotation member.

DESCRIPTION OF EMBODIMENTS

Figure 1:
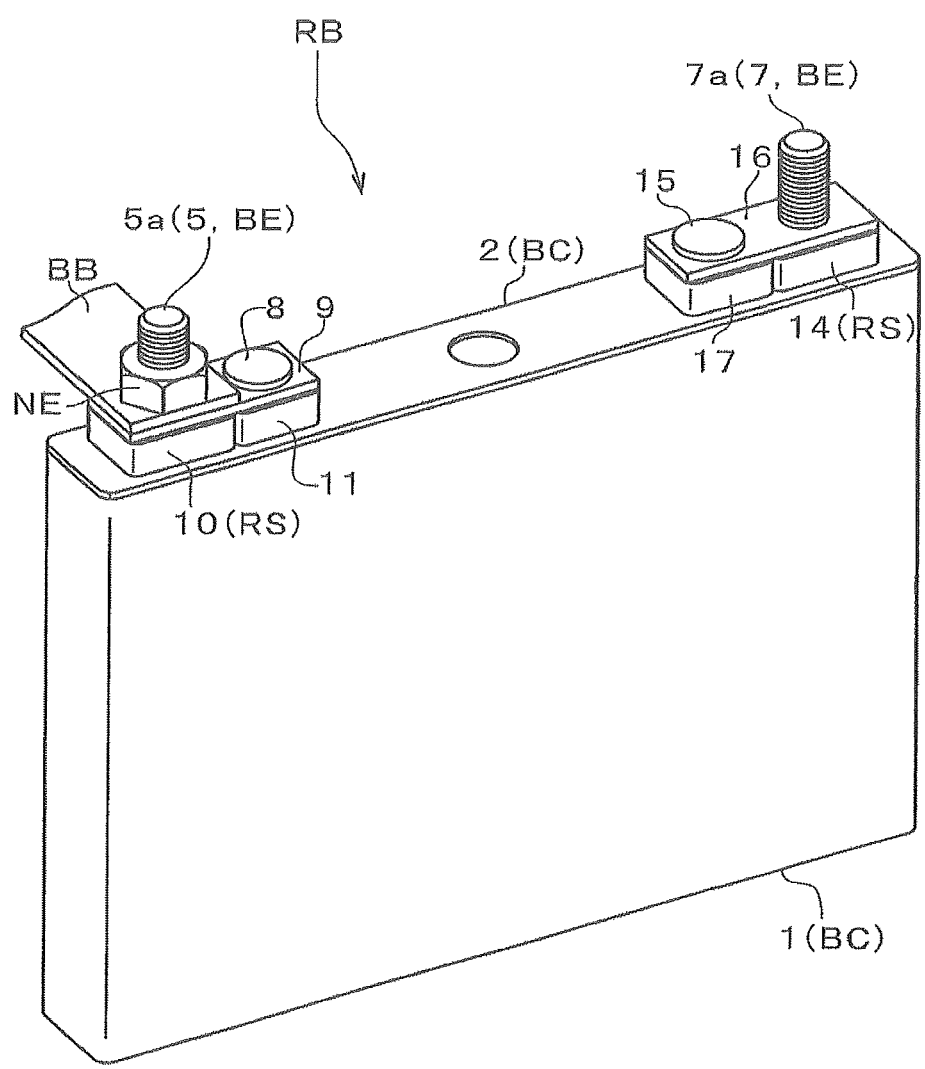
FIG. 1 is a perspective view of the appearance of an electric storage device according to a first embodiment of the present invention.

Hereinafter, embodiments of an electric storage device to which the present invention is applied are described with reference to the drawings First of all, an outline of the electric storage device of the present invention is described.

A fastening structure of the present invention includes: a bolt member; a nut member configured to cooperate with the bolt member so as to fix an object to be fixed by being fastened with the bolt member; and an anti-rotation member configured to prevent rotation of one of the bolt member and the nut member about a rotation axis by an engaging action with the one member, wherein the one member is attached so as to permit its displacement toward the other member side following the fastening operation with the other member of the bolt member and the nut member, and the one member or the anti-rotation member is formed to allow a maximum engaging width between the one member and the anti-rotation member in a direction orthogonal to the rotation axis to be reduced as the one member is displaced toward the other member side following the fastening of the bolt member and the nut member.

According to the fastening structure, when the bolt member and the nut member are fastened, with the object to be fixed interposed therebetween, one of the bolt member and the nut member engages the anti-rotation member. Therefore, the fastening operation is smoothly performed.

With the fastening operation of the bolt member and the nut member, the one member of the bolt member and the nut member which engages the anti-rotation member is displaced toward the other member side. Then, the maximum engaging width between the one member and the anti-rotation member in a direction orthogonal to the rotation axis is reduced in the engaging portions of the one member and the anti-rotation member.

This means that the force to maintain the engagement between the two, which acts when the anti-rotation member receives the one member so as to prevent the rotation, is reduced with the fastening operation of the bolt member and the nut member.

Accordingly, the one member starts rotating, when an excessive rotational operation force acts on the other member in the fastening operation of the bolt member and the nut member, despite the completion of the fastening with a necessary and sufficient coupling strength, and a force exceeding the force to maintain the engagement between the one member and the anti-rotation member acts thereon.

Thus, the fastening structure of the present invention avoids continuous application of the excessive rotational operation force. Further, when an excessive rotational force is applied, the load of the rotational operation becomes low. Therefore, those who operate the fastening structure can recognize that the excessive rotational force has been applied in the fastening operation of the bolt member and the nut member.

Therefore, when those who operate the fastening structure have applied an excessive rotational force in the fastening operation of the bolt member and the nut member, continuous application of the excessive rotational operation force is avoided. Further, when an excessive rotational force is applied, the load of the rotational operation becomes low. Therefore, the operator can recognize such a state. Accordingly, it is possible to prevent damage due to excessive tightening as much as possible while the fixation of the object to be fixed by the bolt member and the nut member is facilitated.

According to an aspect, the fastening structure of the present invention may have a configuration in which the one member or the anti-rotation member has an engaging portion between the one member and the anti-rotation member that is tapered or formed stepwise so as to be narrowed toward an end in the rotation axis direction, thereby allowing the maximum engaging width to be reduced with the displacement of the one member.

According to the fastening structure, the one member or the anti-rotation member has an engaging portion between the anti-rotation member and the one member that is tapered or formed stepwise to be narrowed toward the end in the rotation axis direction of the bolt member, or the like. Therefore, the maximum engaging width between the one member and the anti-rotation member is reduced as the one member is displaced toward the other member side.

Therefore, a configuration in which the maximum engaging width between the one member and the anti-rotation member is reduced as the one member is displaced toward the other member side is achieved by using such a simple shape.

According to another aspect, the fastening structure of the present invention may have a configuration in which the anti-rotation member is fixed to a device case of an electric storage device housing an electric storage element, and the object to be fixed includes an electrical connection member configured to electrically connect the electric storage device to an external component.

According to the fastening structure, an electrode terminal structure of an electric storage device is often formed by fastening the bolt member and the nut member with an electrical connection member that is an electrical connection wiring therebetween, in order to electrically connect the electric storage device to another electric storage device or an external component such as a circuit component.

In such a case, the engagement between the one member and the anti-rotation member allows the fastening action of the bolt member and the nut member to be smoothly performed. Further, when an excessive rotational operation force acts on the other member, despite the completion of the fastening with a necessary and sufficient coupling strength, continuous application of the excessive rotational operation force is avoided.

Therefore, it is possible to prevent damage due to excessive tightening as much as possible while the fixation of the electrical connection member with the bolt member and the nut member is facilitated, in the terminal structure of the electric storage device.

In this case, it is preferable that the bolt member and the nut member be fastened, with the electrical connection member and a wiring member that is electrically connected to the electric storage element being interposed, as the object to be fixed, therebetween.

According to the fastening structure, the one member itself that engages the anti-rotation member may be configured as a conductive path for electrical connection with other components. However, when the bolt member and the nut member are configured to be fastened, with the wiring member electrically connected to the electric storage element inside the device case and the electrical connection member being interposed therebetween, the bolt member and the nut member need to perform only their inherent fastening functions. The degree of freedom, for example, in designing the arrangement configuration of the bolt member and the nut member or selecting the material thereof increases. This fastening structure can contribute to a reduction in development cost of electric storage devices.

A fastening structure of the present invention includes: a bolt member; a nut member configured to cooperate with the bolt member so as to fix an object to be fixed by being fastened with the bolt member; and an anti-rotation member configured to prevent rotation of one of the bolt member and the nut member about a rotation axis, wherein the one member is attached so as to permit its displacement toward the other member side following the fastening operation with the other member of the bolt member and the nut member, the one member and the anti-rotation member have engaging portions configured to engage each other, and one of the engaging portions of the one member and the anti-rotation member is formed to be narrowed toward the other member of the engaging portions of the one member and the anti-rotation member.

According to the fastening structure, when the bolt member and the nut member are fastened, with the object to be fixed being interposed therebetween, one of the bolt member and the nut member engages the anti-rotation member. Therefore, the fastening operation is smoothly performed.

Then, the force to maintain the engagement between the two, which acts when the anti-rotation member receives the one member so as to prevent the rotation, is reduced with the fastening operation of the bolt member and the nut member.

Accordingly, the one member starts rotating, when an excessive rotational operation force acts on the other member in the fastening operation of the bolt member and the nut member, despite the completion of the fastening with a necessary and sufficient coupling strength, and a force exceeding the force to maintain the engagement between the one member and the anti-rotation member acts thereon.

Thus, the fastening structure of the present invention avoids continuous application of the excessive rotational operation force. Further, when an excessive rotational force is applied, the load of the rotational operation becomes low. Therefore, those who operate the fastening structure can recognize that the excessive rotational force has been applied in the fastening operation of the bolt member and the nut member.

Therefore, when those who operate the fastening structure have applied an excessive rotational force in the fastening operation of the bolt member and the nut member, continuous application of the excessive rotational operation force is avoided. Further, when an excessive rotational force is applied, the load of the rotational operation becomes low. Therefore, the operator can recognize such a state. Accordingly, it is possible to prevent damage due to excessive tightening as much as possible while the fixation of the object to be fixed by the bolt member and the nut member is facilitated.

In the following embodiments, a battery cell that exemplifies the electric storage device is described. In particular, a non-aqueous electrolyte secondary battery cell is described as an example of secondary battery cells. More specifically, the non-aqueous electrolyte secondary battery cell is a lithium-ion battery cell.

First Embodiment

Configuration of Non-aqueous Electrolyte Secondary Battery Cell RB

As shown in the perspective view of FIG. 1, a non-aqueous electrolyte secondary battery cell RB of a first embodiment has a device case BC (hereinafter, referred to simply as "case BC"). The case BC includes a can body 1 having a bottomed cylindrical shape (more specifically, a bottomed rectangular cylindrical shape) and a cover 2 welded to cover over the open face of the can body 1. The cover 2 is formed of a strip-shaped rectangular plate member. A terminal bolt 5 that is a positive electrode terminal and a terminal bolt 7 that is a negative electrode terminal are attached to the surface of the cover 2 on the outer side of the case BC.

The can body 1 has a flattened rectangular parallelepiped shape corresponding to the shape of the cover 2. Accordingly, the case BC as a whole also has a flattened, substantially rectangular parallelepiped shape.

The secondary battery cell RB has a terminal structure for implementing electrical connection with a bus bar BB and mechanical fixation of the bus bar BB. The bus bar BB is an electrical connection member for electrical connection to an external component. A bolt member BE and a nut member NE are fastened together in the state where the bus bar BB as an object to be fixed is interposed between the head of the bolt member BE and the nut member NE. Further, an anti-rotation member RS is fixed to the case BC. One of the bolt member BE and the nut member NE is screwed into the other member in the state where the one member of the bolt member BE and the nut member NE engages the anti-rotation member RS so as to be prevented from rotating. Hereinafter, the one member of the bolt member BE and the nut member NE which engages the anti-rotation member RS may be referred to as "one member", and the other member that does not engage the anti-rotation member RS may be referred to as "the other member", for convenience of description.

In the first embodiment, the terminal bolts 5 and 7 of the positive electrode and the negative electrode serving as bolt members BE are configured to act to engage the anti-rotation member RS, which will be described below. That is, the terminal bolts 5 and 7 correspond to the aforementioned one member.

FIG. 1 shows the state where only the terminal bolt 5 on the positive electrode side is connected to the bus bar BB. However, the terminal bolt 7 on the negative electrode side has the same configuration as the terminal bolt 5 on the positive electrode side. The terminal bolt 7 on the negative electrode side also is electrically connected to an external component by fastening the bolt member BE (terminal bolt 7) and the nut member NE.

Figure 2:
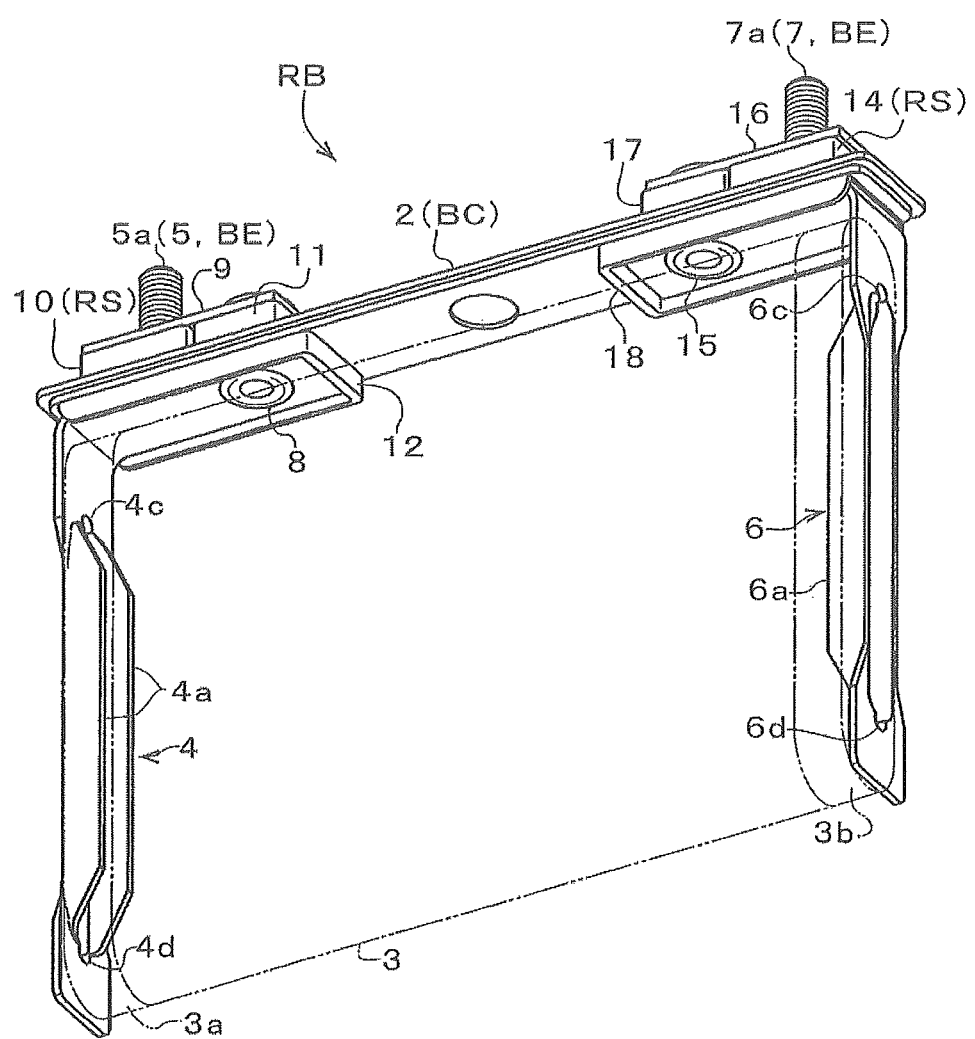
FIG. 2 is a perspective view showing an internal configuration of the electric storage device according to the first embodiment of the present invention.

An electric storage element 3, which is schematically shown in FIG. 2 by two-dot chain lines, and current collectors 4 and 6 in the form of plates are provided inside the case BC. The electric storage element 3 and the current collectors 4 and 6 are housed inside the case BC in the state where the electric storage element 3 and the current collectors 4 and 6 are immersed in an electrolyte. FIG. 2 is a perspective view, as seen upward from below, excluding the can body 1. FIG. 2 shows the inside of the case BC.

The current collectors 4 and 6 are members for electrically connecting the electric storage element 3 to the terminal bolts 5 and 7. In this embodiment, since the secondary battery cell RB is shown as an example of the electric storage device, the electric storage element 3 is referred to as "electrode assembly 3" in the following description.

The current collector 4 and the current collector 6 each serve as a conductor. The current collector 4 and the current collector 6 have a relationship in which the current collector 4 and the current collector 6 having substantially the same shape are symmetrically arranged. However, the materials of the current collector 4 and the current collector 6 are different from each other. The current collector 4 on the positive electrode side is made of aluminum, and the current collector 6 on the negative electrode side is made of copper.

The current collector 4 or 6 is formed by bending a plate member made of the aforementioned metal material into a specific shape. The current collector 4 or 6 includes a horizontally oriented portion extending along the surface of the cover 2 on which the terminal bolt 5 or 7 is arranged and a vertically oriented portion extending in the normal direction to the surface of the cover 2 on the inner side of the case BC. The vertically oriented portion is a portion formed by bending the plate member at 90 degree near the end portion in the longitudinal direction of the cover 2 and extending it downward (toward the opposite side of the terminal bolt 5 or 7). The current collector 4 or 6 is bent into a substantially L-shape connecting the horizontally oriented portion and the vertically oriented portion. The vertically oriented portion includes a connection part 4a or 6a for connection to the electrode assembly 3. The connection part 4a or 6a is bent toward the electrode assembly 3 side. The connection part 4a or 6a is formed by forming a pair of through holes 4c and 4d or through holes 6c and 6d at the top and the bottom of a flat plate, making a cut between the through holes 4c and 4d or between the through holes 6c and 6d, and pushing out the cut portion, for example, by pressing.

The current collector 4 or 6 has a narrow rectangular shape corresponding to the flat shape of the case BC. The current collector 4 or 6 as a whole is bent in a posture extending along the side surface on the short side of the case BC.

The electrode assembly 3 has a configuration of a so-called wound type. The electrode assembly 3 includes a positive electrode foil plate, a negative electrode foil plate, an elongated strip-shaped separator interposed between the positive electrode foil plate and the negative electrode foil plate. The positive electrode foil plate is formed by applying a positive electrode active material to an elongated strip-shaped base metal foil made of aluminum. The negative electrode foil plate is formed by applying a negative electrode active material to an elongated strip-shaped base metal foil made of copper. The separator is interposed between the negative electrode foil plate and the positive electrode foil plate, and they are wound into a flat shape in the longitudinal direction, to have the pair of positive electrode foil plate and negative electrode foil plate stacked in layers.

The electrode assembly 3 of the wound type includes an uncoated portion 3a or 3b, in which the base metal foil of the positive electrode foil plate or the negative electrode foil plate is exposed at one lateral end portion in the width direction, for electrical connection to the current collector 4 or 6. The uncoated portion 3a on the positive electrode side and the uncoated portion 3b on the negative electrode side are located opposite to each other in the width direction. In the wound state as described above, the uncoated portion 3a on the positive electrode side extends from one end in the winding axis direction of the electrode assembly 3 (in the width direction of the electrode foil plate), and the uncoated portion 3b on the negative electrode side extends from the other end (on the opposite side of the uncoated portion 3a) in the winding axis direction of the electrode assembly 3 (in the width direction of the electrode foil plate).

The layers of the uncoated portion 3a that is a metal foil extending from the positive electrode foil plate of the electrode assembly 3 are bundled, and the bundled uncoated portion 3a and the current collector 4 are joined by ultrasonic welding. The layers of the uncoated portion 3b that is a metal foil extending from the negative electrode foil plate of the electrode assembly 3 are bundled, and the bundled uncoated portion 3b and the current collector 6 are joined by ultrasonic welding.

As described above, the terminal bolt 5 or 7 is attached to the cover 2 made of metal (specifically, made of aluminum). The terminal bolt 5 on the positive electrode side is electrically connected to the current collector 4 on the positive electrode side. The terminal bolt 7 on the negative electrode side is electrically connected to the current collector 6 on the negative electrode side.

The materials of the attaching structure of the terminal bolt 5 to the cover 2 and the connection structure between the terminal bolt 5 and the current collector 4 are different from those of the attaching structure of the terminal bolt 7 to the cover 2 and the connection structure between the terminal bolt 7 and the current collector 6. However, the structures having the same shape are symmetrically arranged. Hereinafter, the configuration on the positive electrode side is mainly described.

The terminal bolt 5 is electrically connected to the current collector 4 via a rivet 8 and a metal plate 9. The rivet 8 is made of a metal material. More specifically, the rivet 8 on the positive electrode side is made of aluminum like other metal members on the positive electrode side. As the metal plate 9, copper to which nickel metal plating is applied, for example, can be used. The head of the rivet 8 is fixed to the metal plate 9 with the metal plate 9 held therebetween.

Figure 4A:
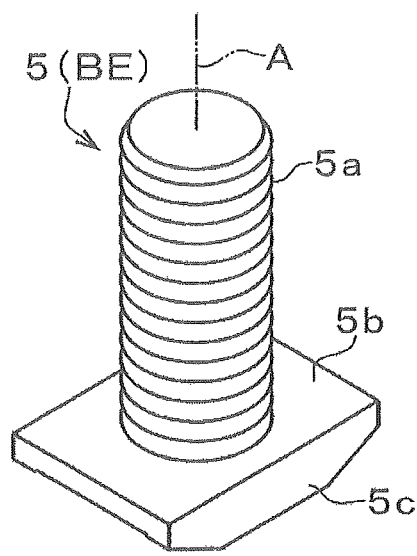
FIG. 4A is a perspective view of a bolt member according to the first embodiment of the present invention.
Figure 4B:
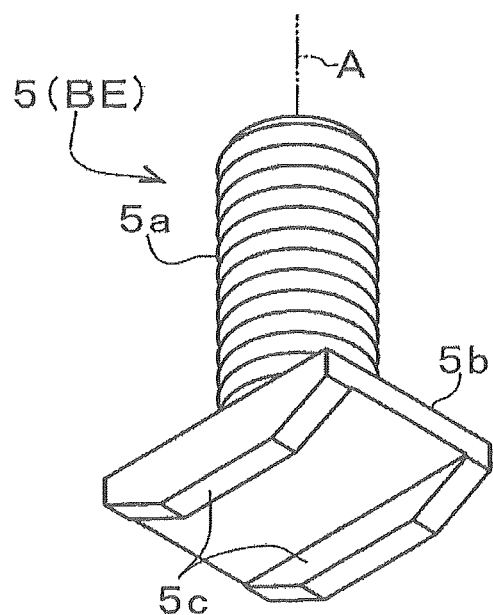
FIG. 4B is a perspective view of the bolt member according to the first embodiment of the present invention.

As shown in FIG. 4A and FIG. 4B, the terminal bolt 5 is composed of a threaded portion 5*a* and a substantially rectangular head 5*b*. The material of the terminal bolt 5 may be metal such as steel.

Figure 5:
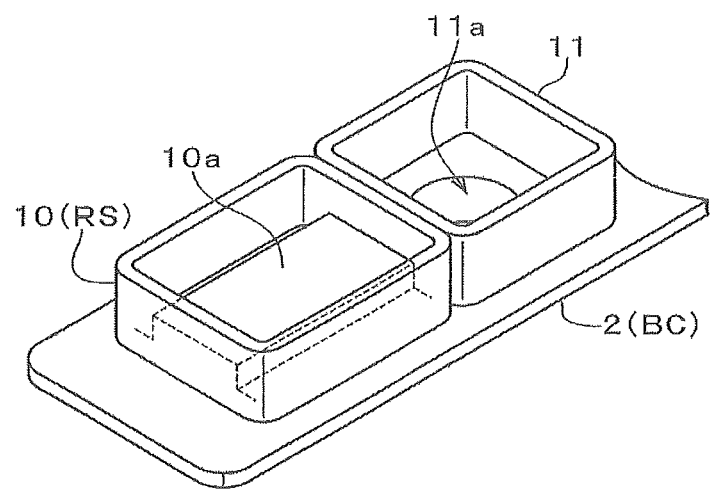
FIG. 5 is a perspective view showing an anti-rotation member according to the first embodiment of the present invention.

FIG. 5 shows the vicinity of the end of the cover 2 before the terminal bolt 5, the rivet 8, and the metal plate 9 are attached thereto. As shown in FIG. 5, a holding frame 10 is attached to a surface of the cover 2 on the outer side of the case BC so as to be fixed thereto.

The holding frame 10 has a recess in the form of a tray that is open on the top side. The recess matches the rectangular shape of the head 5*b* of the terminal bolt 5. The holding frame 10 is formed using a resin that is an electrically insulating material. The holding frame 10 ensures the electrical insulation between the terminal bolt 5 and the cover 2.

A step 10*a* is formed at the bottom of the holding frame 10. The step 10*a* extends over the entire width of the recess of the holding frame 10 in the longitudinal direction of the cover 2. The step 10*a* acts to engage the head 5*b* of the terminal bolt 5 so as to prevent rotation of the terminal bolt 5 about the rotation axis thereof (shown by the two-dot chain line A in FIG. 3). The holding frame 10 functions as the aforementioned anti-rotation member RS.

Figure 6:
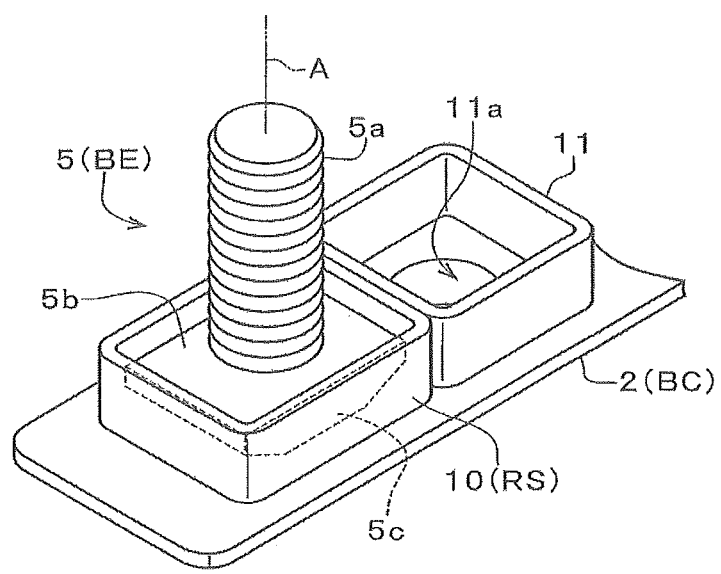
FIG. 6 is a perspective view showing the bolt member and the anti-rotation member according to the first embodiment of the present invention when they are assembled together.

A pair of raised portions 5*c* configured to engage the step 10*a* are formed on the head 5*b* of the terminal bolt 5 (see FIG. 4A and FIG. 4B). The pair of raised portions 5*c* are formed in a posture standing in the rotation axis direction (in the rotation axis direction opposite to the threaded portion 5*a*) from a pair of opposite sides of the rectangular flat surface of the head 5*b* of the terminal bolt 5. As shown in FIG. 6, the pair of raised portions 5*c* have a positional relationship sandwiching the step 10*a* of the holding frame 10 from both sides in the state where the head 5*b* of the terminal bolt 5 is arranged within the holding frame 10. When a rotational operation force about the rotation axis acts on the terminal bolt 5, the terminal bolt 5 is prevented from rotating due to the engaging action between the step 10*a* and the raised portions 5*c*.

The electrical insulation between the current path from the current collector 4 to the terminal bolt 5 and the cover 2 is ensured by an upper gasket 11 and a lower gasket 12. The upper gasket 11 and the lower gasket 12 are sealing members. The upper gasket 11 and the lower gasket 12 are both formed using an electrical insulating material (more specifically, a resin). Further, a through portion of the cover 2 through which the rivet 8 passes is hermetically sealed.

The upper gasket 11 has a rectangular parallelepiped container in the form of a tray whose top is open, and a cylindrical part 11*a* attached to the bottom of the rectangular parallelepiped container. The aforementioned rectangular parallelepiped container holds around the head of the rivet 8. The cylindrical part 11*a* is fitted into an opening of the cover 2. The rivet 8 is fitted into the internal space of the cylindrical part 11*a*.

In the state where the terminal bolt 5 and others are attached to the cover 2, the bottom of the upper gasket 11 is sandwiched between the head of the rivet 8 and the cover 2.

In the state where the current collector 4 and others are attached to the cover 2, the lower gasket 12 is sandwiched between the aforementioned horizontally oriented portion of the current collector 4 and the cover 2.

The rivet 8 is crimped with the rivet 8 passing through the cylindrical part 11*a* of the upper gasket 11, the cover 2, the lower gasket 12, and the horizontally oriented portion of the current collector 4. Therefore, the horizontally oriented portion of the current collector 4 is fixed to the cover 2, and the current collector 4 and the metal plate 9 are electrically connected to each other.

As shown in the perspective view of FIG. 2, the configuration of the negative electrode side is the same as the configuration of the positive electrode side when it is symmetrically arranged with respect to the center of the cover 2. The members, which have the same shape as the members on the positive electrode side, in the configuration on the negative electrode side are denoted by the same names as the corresponding members on the positive electrode side. A holding frame 14 is attached to the cover 2 outside the case BC on the negative electrode side so as to be fixed thereto, and the holding frame 14 holds the head of the terminal bolt 7. A metal plate 16 is fixed to a rivet 15, and the rivet 15 and the terminal bolt 7 are electrically connected to the metal plate 16.

While the head of the rivet 15 is held by an upper gasket 17, the rivet 15 is crimped with the upper gasket 17, the cover 2, a lower gasket 18, and the current collector 6 sandwiched between itself and the head of the rivet 15.

The rivet 15 is made of copper like the current collector 6. The rivet 15 electrically connects the current collector 6 and the metal plate 16 to each other.

Connection of Secondary Battery Cell RB to External Component

Next, electrically connection of the secondary battery cell RB configured as above to another electric storage device or the like is described.

In the first embodiment, the bus bar BB is used as an electrical connection member for electrical connection to an external component such as another electric storage device. The bus bar BB is a plate member made of alloy containing copper as a main component.

In the first embodiment, the terminal bolt 5 or 7 and the nut member NE are fastened together, with the bus bar BB and the metal plate 9 or 16 that is a wiring member electrically connected to the electrode assembly 3 being interposed as an object to be fixed between the head of the terminal bolt 5 or 7 and the nut member NE, thereby allowing the bus bar BB and the electrode assembly 3 to be electrically connected to each other.

In the fastening operation of the terminal bolt 5 or 7 and the nut member NE, the holding frame 10 or 14 serves to prevent rotation of the terminal bolt 5 or 7, as described above. However, the engagement state for preventing the rotation between the terminal bolt 5 or 7 and the holding frame 10 or 14 changes as the fastening operation proceeds.

This change of the engagement state is also the same between the change of the engagement state on the positive electrode side and the change of the engagement state on the negative electrode side. Therefore, the change of the engagement state on the positive electrode side is described as a representative example.

Of the bolt member BE (the terminal bolt 5) and the nut member NE, the one member (the terminal bolt 5) that engages the anti-rotation member RS (the holding frame 10) is attached so as to permit its displacement toward the other member (the nut member NE) side following the fastening operation with the other member.

Figure 3:
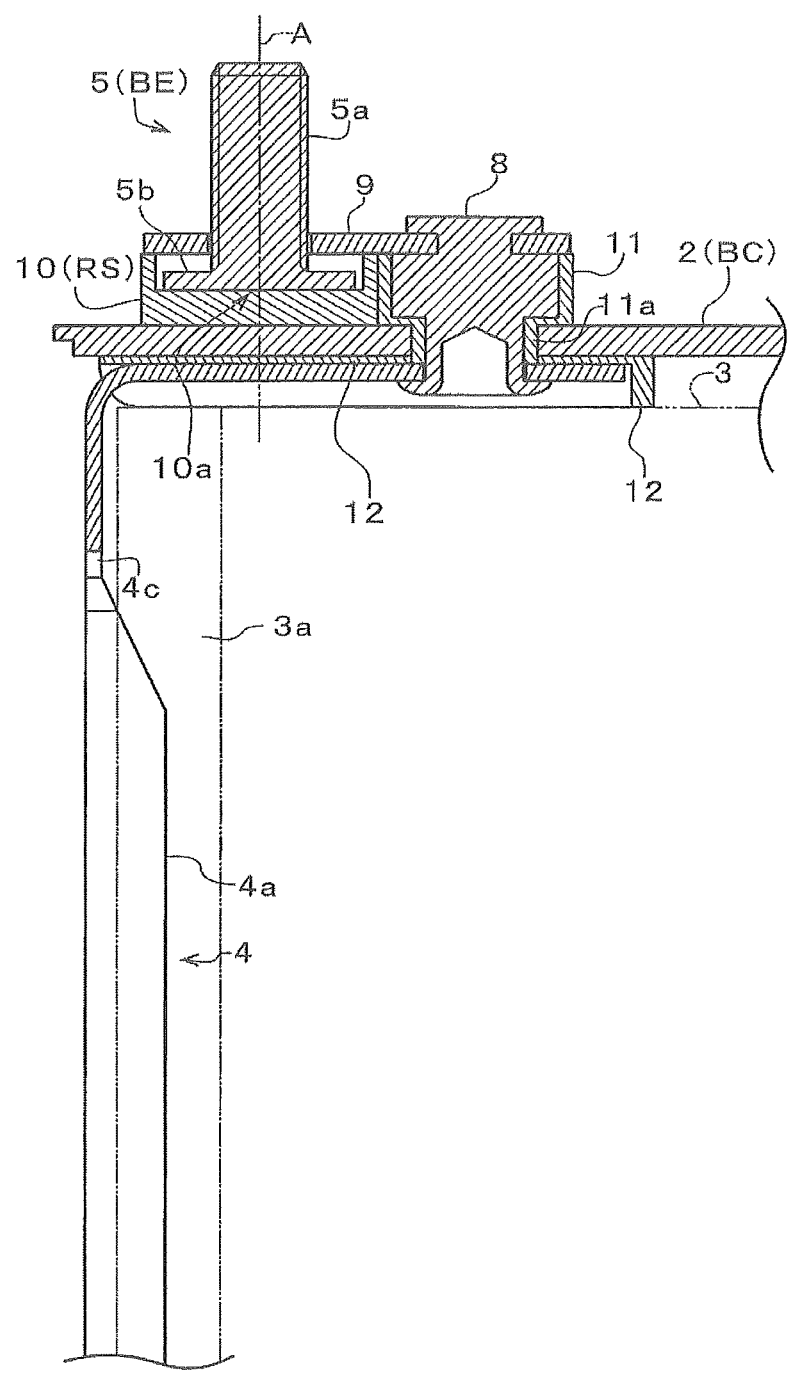
FIG. 3 is a sectional view of a main part of the electric storage device according to the first embodiment of the present invention.

Specifically, small gaps are present between the metal plate 9 and the head 5*b* of the terminal bolt 5 in the rotation axis direction of the terminal bolt 5 when the terminal bolt 5 is arranged within the holding frame 10, as shown in FIG. 3 and others. With the fastening operation of the terminal bolt 5 and the nut member NE, the head 5*b* of the terminal bolt 5 is displaced toward the nut member NE side (upward)

along its rotation axis direction. During the displacement process, the engagement state between the head 5b of the terminal bolt 5 and the step 10a of the holding frame 10 changes.

This process is described with reference to FIG. 7A, FIG. 7B, FIG. 8A, and FIG. 8B. FIG. 7A, FIG. 7B, FIG. 8A, and FIG. 8B are all sectional views taken in the same direction as FIG. 3. FIG. 7A, FIG. 7B, FIG. 8A, and FIG. 8B each show a sectional view taken along a cut surface at a position slightly inside the inner wall of the holding frame 10 without overlapping the head 5b of the terminal bolt 5. In the sectional view at this position, the nut member NE also partially appears as a cross section. However, the cross section of the nut member NE is not shown in the drawings for clarity.

Figure 7A:
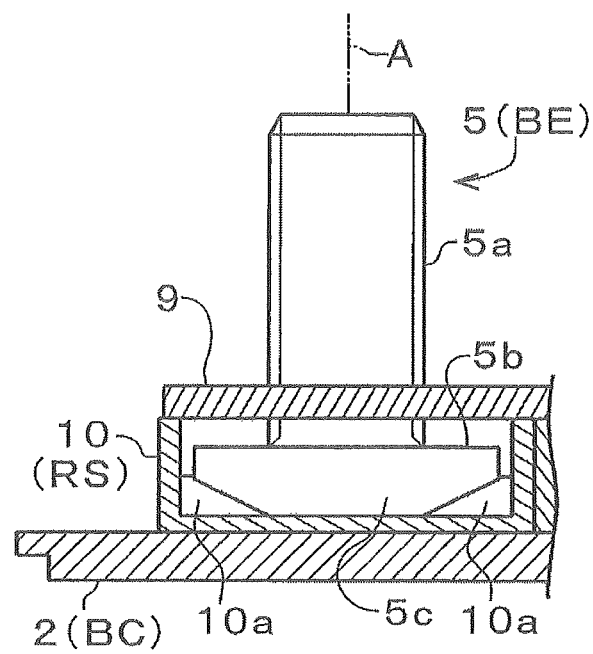
FIG. 7A is a sectional view showing a fastening operation according to the first embodiment of the present invention.
Figure 7B:
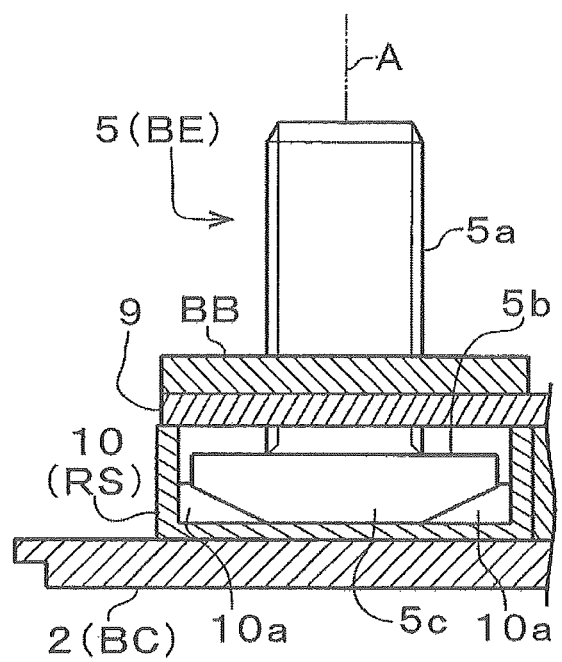
FIG. 7B is a sectional view showing the fastening operation according to the first embodiment of the present invention.

FIG. 7A shows the state where the head 5b of the terminal bolt 5 is arranged within the holding frame 10, and the threaded portion 5a is passed through the through hole formed in the metal plate 9. FIG. 7B shows the state where the threaded portion 5a is passed through a through hole that is formed further in the bus bar BB, for example, for electrical connection to another electric storage device.

Figure 8A:
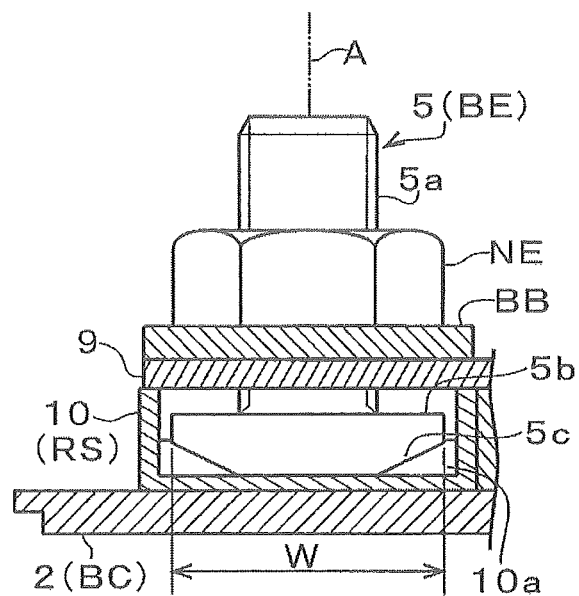
FIG. 8A is a sectional view showing the fastening operation according to the first embodiment of the present invention.

From this state, FIG. 8A shows the state where the nut member NE is screwed into the threaded portion 5a down to a position in contact with the bus bar BB. In this state, the head 5b of the terminal bolt 5 is located at the lowest position.

The raised portions 5c are formed on the head 5b of the terminal bolt 5 that is the one member of the bolt member BE and the nut member NE which acts to engage the anti-rotation member RS, as described above. The raised portions 5c serve as engaging portions with the anti-rotation member RS (the holding frame 10). As shown in FIG. 4B, the raised portions 5c are tapered, as viewed in the rotation axis direction of the terminal bolt 5, etc., to be narrowed toward an end (the end on the opposite side of the nut member NE that is the other member of the bolt member BE and the nut member NE) in the rotation axis direction.

In the state shown in FIG. 8A, the maximum engaging width between the step 10a of the holding frame 10 and the raised portions 5c of the terminal bolt 5, as viewed in the rotation axis direction of the terminal bolt 5, is a width "W" shown in FIG. 8A. The maximum engaging width is the maximum value of the engaging width of the engaging portions between the step 10a of the holding frame 10 and the raised portions 5c of the terminal bolt 5, in a plane orthogonal to the rotation axis of the terminal bolt 5.

When the nut member NE is further screwed into the bolt member BE, the head 5b of the terminal bolt 5 is displaced upward (toward the nut member NE side). When the nut member NE is fully screwed into the bolt member BE, the head 5b is brought into pressure contact with the metal plate 9, as shown in FIG. 8B.

Figure 8B:
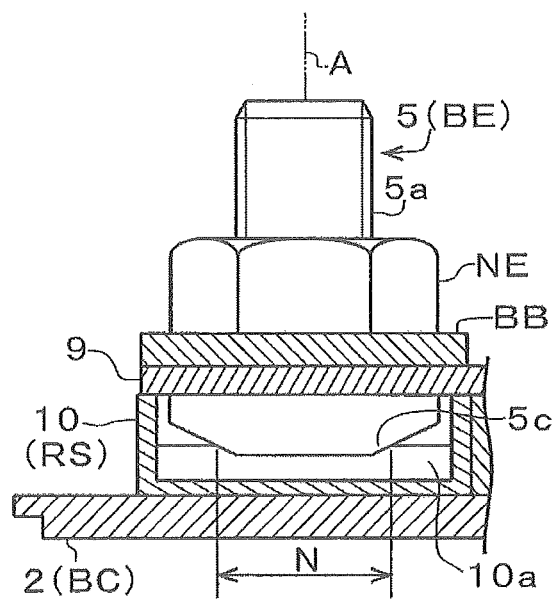
FIG. 8B is a sectional view showing the fastening operation according to the first embodiment of the present invention.

In this state, the maximum engaging width between the step 10a of the holding frame 10 and the raised portions 5c of the terminal bolt 5, as viewed in the rotation axis direction of the terminal bolt 5, is a width "N(N<W)" shown in FIG. 8B.

That is, the aforementioned maximum engaging width is continuously reduced with the displacement of the terminal bolt 5 (the one member) toward the nut member NE (the other member) side following the fastening of the terminal bolt 5 and the nut member NE.

Accordingly, in the state shown in FIG. 8B, the force with which the step 10a of the holding frame 10 prevents the rotation of the head 5b of the terminal bolt 5 is reduced. When the nut member NE is further rotationally operated forcibly from the state shown in FIG. 8B where the screwing is appropriately completed, the raised portions 5c of the terminal bolt 5 start rotating while deforming the upper end of the step 10a of the holding frame 10, also due to the terminal bolt 5 being made of metal and the holding frame 10 being made of resin. Thus, damage such as stripped screw threads of the threaded portion 5a of the terminal bolt 5 is prevented.

Second Embodiment

Next, a second embodiment of an electric storage device to which the present invention is applied is described. The electric storage device of the second embodiment is also configured as the secondary battery cell RB, in the same manner as the electric storage device of the first embodiment. The electric storage device of the second embodiment is different from the electric storage device of the first embodiment concerning the shape of the terminal bolts 5 and 7. The configuration of other parts of the electric storage device of the second embodiment is the same as that of the electric storage device of the first embodiment.

Also in the second embodiment, the terminal structure on the positive electrode side and the terminal structure on the negative electrode side of the same shape are symmetrically arranged as the terminal structure of the secondary battery cell RB. The terminal structure on the positive electrode side is described as a representative example.

Figure 9A:
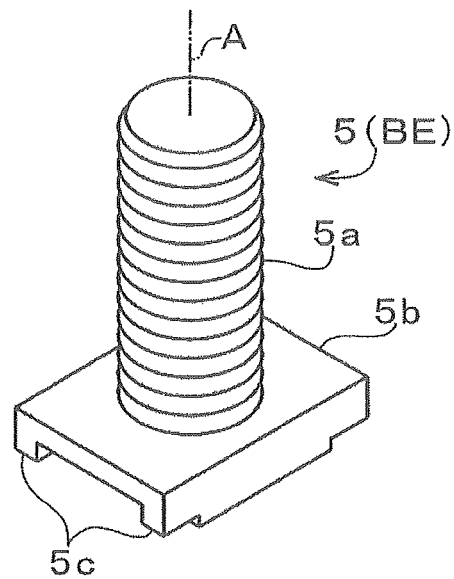
FIG. 9A is a perspective view of a bolt member according to a second embodiment of the present invention.
Figure 9B:
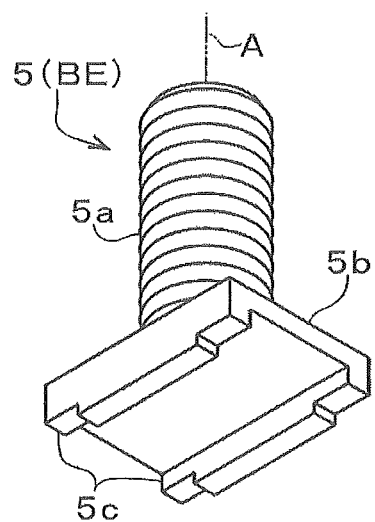
FIG. 9B is a perspective view of the bolt member according to the second embodiment of the present invention.

The terminal bolt 5 of the second embodiment has the shape shown in the perspective views of FIG. 9A and FIG. 9B. The material thereof may be the same as that of the terminal bolt 5 of the first embodiment.

The terminal bolt 5 of the second embodiment, like the terminal bolt 5 of the first embodiment shown in FIG. 4A and FIG. 4B, is composed of the threaded portion 5a and the head 5b having a substantially rectangular shape. Further, the pair of raised portions 5c configured to engage the step 10a of the holding frame 10 are formed on the head 5b. The positions to form the raised portions 5c are also the same as in the first embodiment.

Accordingly, the pair of raised portions 5c have a positional relationship so as to sandwich the step 10a of the holding frame 10 from both sides in the state where the head 5b of the terminal bolt 5 is arranged within the holding frame 10. When a rotational operation force about the rotation axis acts on the terminal bolt 5, the terminal bolt 5 is prevented from rotating due to the engaging action between the step 10a and the raised portions 5c, in the same manner as the terminal bolt 5 of the first embodiment.

The shape of the raised portions 5c of the terminal bolt 5 of the second embodiment is different from that of the first embodiment. In the first embodiment, the raised portions 5c of the terminal bolt 5 are tapered, as viewed in the rotation axis direction, to be narrowed toward the end in the rotation axis direction. However, in the second embodiment, the raised portions 5c of the terminal bolt 5 are formed stepwise, as viewed in the rotation axis direction of the terminal bolt 5, etc., to be narrowed toward an end in the rotation axis direction, as shown in FIG. 9A and FIG. 9B. This end is the end on the opposite side of the nut member NE that is the other member of the bolt member BE and the nut member NE.

Accordingly, the maximum engaging width between the step 10a of the holding frame 10 and the raised portions 5c of the terminal bolt 5, as viewed in the rotation axis direction of the terminal bolt 5, is reduced stepwise (in two steps in the second embodiment) with the displacement of the terminal bolt 5 (the one member) toward the nut member NE (the other member) side following the fastening of the terminal bolt 5 and the nut member NE.

Figure 10A:
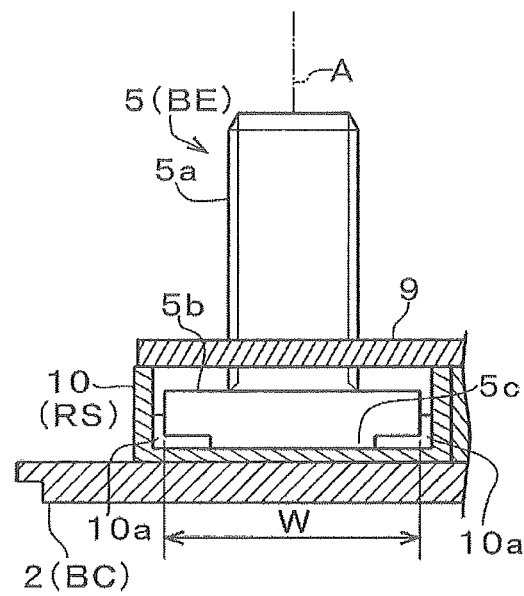
FIG. 10A is a sectional view showing a fastening operation according to the second embodiment of the present invention.
Figure 10B:
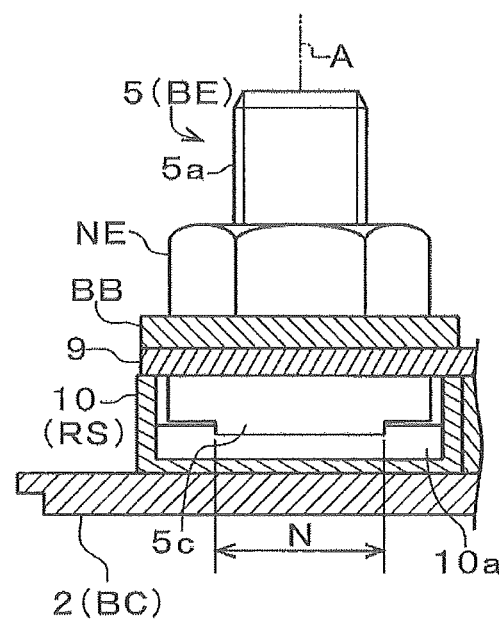
FIG. 10B is a sectional view showing the fastening operation according to the second embodiment of the present invention.

FIG. 10A and FIG. 10B are shown in the same manner as FIG. 7A, FIG. 7B, FIG. 8A, and FIG. 8B of the first embodiment. FIG. 10A and FIG. 10B are specifically described herein. In the state shown in FIG. 10A, which corresponds to FIG. 7A, the maximum engaging width between the step 10*a* of the holding frame 10 and the raised portions 5*c* of the terminal bolt 5, as viewed in the rotation axis direction of the terminal bolt 5, is a width "W" shown in FIG. 10A. The maximum engaging width is the maximum value of the engaging width of the engaging portions between the step 10*a* of the holding frame 10 and the raised portions 5*c* of the terminal bolt 5, in a plane orthogonal to the rotation axis of the terminal bolt 5.

When the nut member NE is fully screwed into the threaded portion 5*a* of the terminal bolt 5, with the metal plate 9 and the bus bar BB interposed therebetween, the terminal bolt 5 is displaced upward (toward the nut member NE side). Then, the head 5*b* and the metal plate 9 are brought into pressure contact with each other, as shown in FIG. 10B.

In this state, the step 10*a* is engaged by only the vicinity of the tapered tips of the raised portions 5*c*. The maximum engaging width between the step 10*a* of the holding frame 10 and the raised portions 5*c* of the terminal bolt 5, as viewed in the rotation axis direction of the terminal bolt 5, is a width "N(N<W)" shown in FIG. 10B.

Thus, damage such as stripped screw threads of the threaded portion 5*a* of the terminal bolt 5 is prevented, even if the nut member NE is further rotationally operated forcibly from the state shown in FIG. 10B where the screwing is appropriately completed.

Third Embodiment

Next, a third embodiment of an electric storage device to which the present invention is applied is described. The electric storage device of the third embodiment is also configured as the secondary battery cell RB, in the same manner as the electric storage device of the first embodiment and the second embodiment. The electric storage device of the third embodiment is different from the electric storage device of the first embodiment and the second embodiment concerning the shape of the terminal bolts 5 and 7, and the shape of the holding frames 10 and 14. The configuration of other parts of the electric storage device of the third embodiment is the same as that of the electric storage device of the first embodiment.

Also in the third embodiment, the terminal structure on the positive electrode side and the terminal structure on the negative electrode side of the same shape are symmetrically arranged as the terminal structure of the secondary battery cell RB. The terminal structure on the positive electrode side is described as a representative example.

Figure 11A:
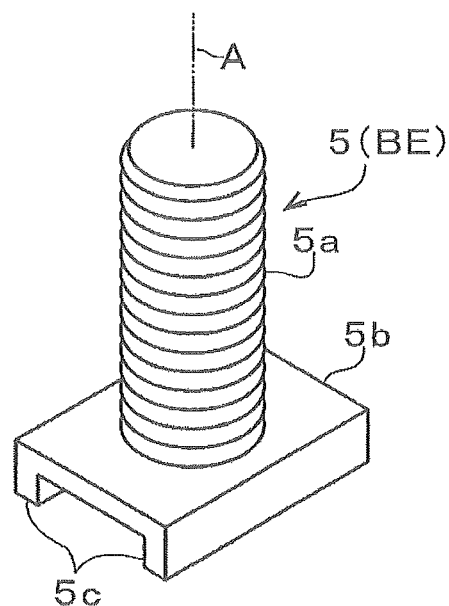
FIG. 11A is a perspective view of a bolt member according to a third embodiment of the present invention.
Figure 11B:
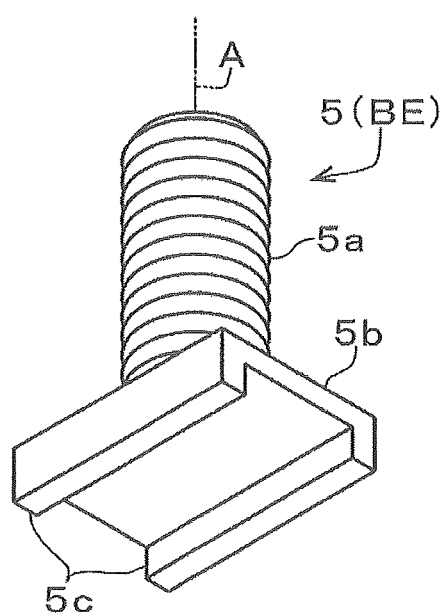
FIG. 11B is a perspective view of the bolt member according to the third embodiment of the present invention.

The terminal bolt 5 of the third embodiment has the shape shown in the perspective views of FIG. 11A and FIG. 11B. The material thereof may be the same as that of the terminal bolt 5 of the first embodiment.

The terminal bolt 5 of the third embodiment, like the terminal bolt 5 of the first embodiment and the second embodiment, is composed of the threaded portion 5*a* and the head 5*b* having a substantially rectangular shape. Further, the pair of raised portions 5*c* configured to engage the step 10*a* of the holding frame 10 are formed on the head 5*b* at the same positions as in the terminal bolt 5, etc., of the first embodiment. However, the shape of the raised portions 5*c* is different from that of the first embodiment, etc.

Figure 12:
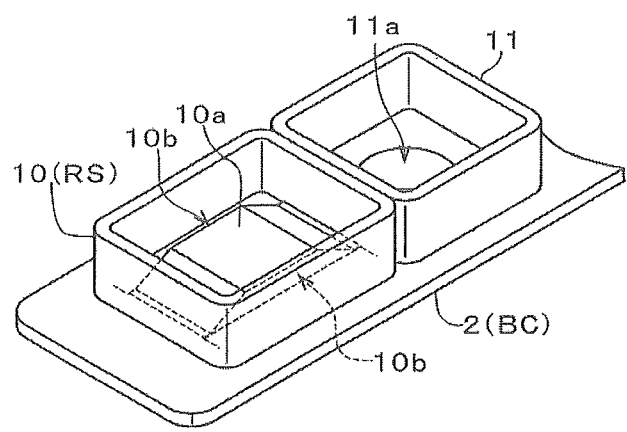
FIG. 12 is a perspective view showing an anti-rotation member according to the third embodiment of the present invention.

The schematic outline of the holding frame 10 of the third embodiment is the same as the schematic outline thereof in the first embodiment and the second embodiment, as shown in FIG. 12 which corresponds to FIG. 5 of the first embodiment. However, the shape of the step 10*a* formed inside the holding frame 10 of the third embodiment is different from the shape of the step 10*a* of the first embodiment and the second embodiment. The material of the holding frame 10 may be the same as in the first embodiment, etc.

The pair of raised portions 5*c* have a positional relationship so as to sandwich the step 10*a* of the holding frame 10 from both sides in the state where the head 5*b* of the terminal bolt 5 is arranged within the holding frame 10. The relationship that the terminal bolt 5 is prevented from rotating due to the engaging action between the step 10*a* and the raised portions 5*c* when a rotational operation force about the rotation axis acts on the terminal bolt 5 is the same as in the terminal bolt 5 of the first embodiment, etc.

The shape of the raised portions 5*c* of the terminal bolt 5 of the third embodiment is different from the shape of the raised portions 5*c* of the first embodiment, etc., in that they have the same height over the entire width in the longitudinal direction.

Further, slopes are formed at both ends of the step 10*a* of the holding frame 10 in the longitudinal direction of the cover 2 (in the longitudinal direction of the raised portions 5*c*), as shown in FIG. 12. A pair of trapezoid side surfaces 10*b* that serve as engaging portions with the raised portions 5*c* of the terminal bolt 5 are provided in the holding frame 10. The pair of trapezoid side surfaces 10*b* are tapered, as viewed in the rotation axis direction of the terminal bolt 5, to be narrowed toward an end in the rotation axis direction. This end is the end on the nut member NE side that is the other member of the bolt member BE and the nut member NE.

Accordingly, the maximum engaging width between the step 10*a* of the holding frame 10 and the raised portions 5*c* of the terminal bolt 5, as viewed in the rotation axis direction of the terminal bolt 5, is continuously reduced with the displacement of the terminal bolt 5 (the one member) toward the nut member NE (the other member) side following the fastening of the terminal bolt 5 and the nut member NE.

Figure 13A:
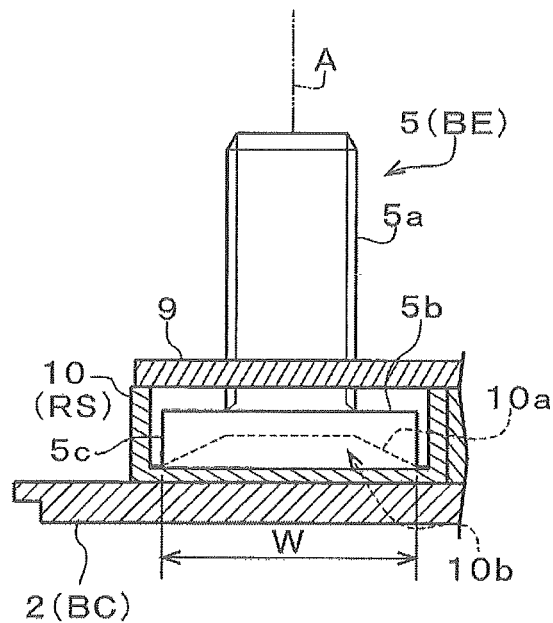
FIG. 13A is a sectional view showing a fastening operation according to the third embodiment of the present invention.
Figure 13B:
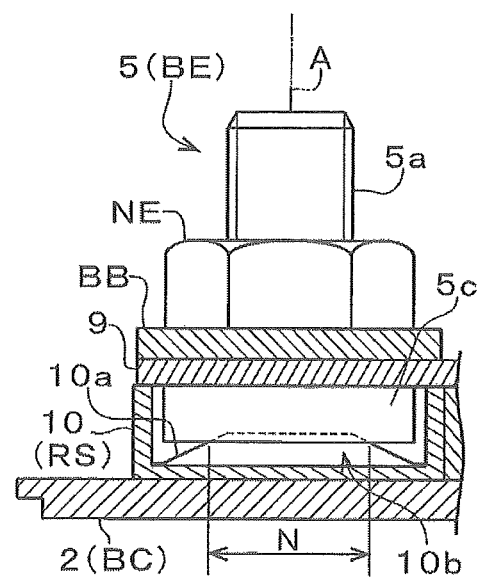
FIG. 13B is a sectional view showing the fastening operation according to the third embodiment of the present invention.

FIG. 13A and FIG. 13B are shown in the same manner as FIG. 7A, FIG. 7B, FIG. 8A, and FIG. 8B in the first embodiment. FIG. 13A and FIG. 13B are specifically described below. In the state shown in FIG. 13A, which corresponds to FIG. 7A, the maximum engaging width between the step 10*a* of the holding frame 10 and the raised portions 5*c* of the terminal bolt 5, as viewed in the rotation axis direction of the terminal bolt 5, is a width "W" shown in FIG. 13A. The maximum engaging width is the maximum value of the engaging width of the engaging portions between the step 10*a* of the holding frame 10 and the raised portions 5*c* of the terminal bolt 5, in a plane orthogonal to the rotation axis of the terminal bolt 5.

When the nut member NE is fully screwed into the threaded portion 5*a* of the terminal bolt 5, with the metal plate 9 and the bus bar BB interposed therebetween, the head 5*b* and the metal plate 9 are brought into pressure contact with each other, as shown in FIG. 13B.

In this state, the raised portions 5*c* are engaged by only the vicinity of the tapered tips of the step 10*a* (the vicinity of the upper ends of the step 10*a*). The maximum engaging width between the step 10*a* of the holding frame 10 and the raised portions 5*c* of the terminal bolt 5, as viewed in the rotation axis direction of the terminal bolt 5, is a width "N(N<W)" shown in FIG. 13B.

Thus, damage such as stripped screw threads of the threaded portion 5*a* of the terminal bolt 5 is prevented, even if the nut member NE is further rotationally operated forcibly from the state shown in FIG. 13B where the screwing is appropriately completed.

Other Embodiments

Other embodiments of the present invention are listed below.

(1) The first to the third embodiments show the case where the terminal bolt 5 or 7 that is the bolt member BE, in the bolt member BE and the nut member NE, acts to engage the holding frame 10 or 14 that is the anti-rotation member RS as an example. That is, the case where the terminal bolt 5 or 7 is the aforementioned one member is shown as an example. However, the present invention can be applied also to a configuration in which the nut member NE is held within the holding frame 10 or 14, to allow the holding frame 10 or 14 to act to engage the nut member NE so as to prevent the rotation thereof.

(2) In the third embodiment, the pair of trapezoid side surfaces 10b of the step 10a formed within the holding frame 10 which serve as engaging portions with the raised portions 5c of the terminal bolt 5 are tapered, as viewed in the rotation axis direction of the terminal bolt 5, to be narrowed toward the end in the rotation axis direction. However, like the shape of the raised portions 5c of the terminal bolt 5 of the second embodiment, the pair of trapezoid side surfaces 10b may be formed stepwise, as viewed in the rotation axis direction of the terminal bolt 5, to be narrowed toward the end in the rotation axis direction.

(3) In the first to the third embodiments, the electric storage device is exemplified by the non-aqueous electrolyte secondary battery cell RB. However, the present invention can be applied also to terminal structures of various electric storage devices such as capacitors.

Further, in addition to such electric storage devices, the present invention can be applied also to the cases where one of the bolt member BE and the nut member is prevented from rotating, in their fastening structure, by the anti-rotation member RS.

REFERENCE SIGNS LIST

BB: Electrical Connection Member
BC: Device Case
BE: Bolt Member
NE: Nut Member
RB: Electric Storage Device
RS: Anti-Rotation Member
3: Electric Storage Element
9, 16: Wiring Member

The invention claimed is:

1. A fastening structure, comprising:
a bolt member;
a nut member configured to cooperate with the bolt member so as to fix an object to be fixed by being fastened with the bolt member; and
an anti-rotation member configured to prevent a rotation of one of the bolt member and the nut member about a rotation axis by an engaging action with one member of the bolt member and the nut member,
wherein at least a bottom part of the one member is inside a holding frame,
wherein the holding frame has a gap so as to permit a displacement of the one member away from the anti-rotation member when the one member following fastening with the other member of the bolt member and the nut member,
wherein the one member engages with a projection of the anti-rotation member to allow a maximum engaging width between the one member and the anti-rotation member in a direction orthogonal to the rotation axis to be reduced as the one member is displaced toward the side of the other member following the fastening of the bolt member and the nut member such that an amount of direct contact surface between the anti-rotation member and the one member is minimized when the displacement is maximized, and
wherein the projection protrudes from a ton surface of the anti-rotation member to engage with a bottom surface of the one member.

2. The fastening structure according to claim 1, wherein the one member or the anti-rotation member includes an engaging portion between the one member and the anti-rotation member that is tapered or is formed stepwise so as to be narrowed toward an end in a rotation axis direction, thereby allowing the maximum engaging width to be reduced with the displacement of the one member.

3. The fastening structure according to claim 1, wherein the anti-rotation member is fixed to a device case of an electric storage device housing an electric storage element, and
wherein the object to be fixed includes an electrical connection member configured to electrically connect the electric storage device to an external component.

4. The fastening structure according to claim 3, wherein the bolt member and the nut member are fastened, with the electrical connection member and a wiring member that is electrically connected to the electric storage element being interposed, as the object to be fixed, therebetween.

5. The fastening structure according to claim 1, wherein the projection comprises a step portion and the one member comprises a raised portion that protrudes from the bottom surface of the one member to engage with the step portion of the anti-rotation member.

6. The fastening structure according to claim 5, wherein the step portion protrudes from the anti-rotation member toward the one member to contact a bottom surface of the raised portion.

7. The fastening structure according to claim 1, wherein the projection protrudes from the top surface of the anti-rotation member in a stacking direction of the bolt member, the object, and the nut member.

8. The fastening structure according to claim 1, wherein, in the direction orthogonal to the rotation axis, a width of the projection is less than an internal width of the anti-rotation member.

9. The fastening structure according to claim 1, wherein the one member or the anti-rotation member includes an engaging portion, located between the one member and the anti-rotation member, that is formed stepwise so as to be narrowed toward an end in a rotation-axis direction.

10. The fastening structure according to claim 1, wherein projection is formed tapered so as to be narrowed toward an end in a rotation-axis direction.

11. A fastening structure, comprising:
a bolt member;
a nut member configured to engage with the bolt member to hold an object to be fixed by being fastened with the bolt member; and
an anti-rotation member configured to prevent a rotation of one of the bolt member and the nut member about a rotation axis by an engaging action with the bolt member, wherein at least a bottom part of the bolt member is inside a holding frame, wherein the holding frame has a gap so as to permit a displacement of the bolt member away from the anti-rotation member when the bolt member following fastening with the nut member, wherein the bolt member engages with a projection of the anti-rotation member to allow a maximum engaging width between the bolt member and the anti-rotation member in a direction orthogonal to the rotation axis to be reduced as the bolt member is displaced toward the side of the nut member following the fastening of the bolt member and the nut member such that an amount of direct contact surface between the anti-rotation member and the bolt member is minimized when the displacement is maximized, wherein the bolt member engages with a projection of the anti-rotation member to allow a maximum engaging width between the bolt member and the anti-rotation member in a direction orthogonal to the rotation axis to be reduced as the bolt member is displaced toward the nut member in fastening of the bolt member and the nut member.

12. The fastening structure according to claim 11, wherein the projection comprises a step portion and the bolt member comprises a raised portion that protrudes from a bottom surface of the bolt member to engage with the step portion of the anti-rotation member.

13. The fastening structure according to claim 12, wherein the step portion protrudes from the anti-rotation member toward the bolt member to contact a bottom surface of the raised portion.

14. The fastening structure according to claim 11, wherein the projection protrudes from a top surface of the anti-rotation member in a stacking direction of the bolt member, the object, and the nut member.

15. The fastening structure according to claim 11, wherein, in the direction orthogonal to the rotation axis, a width of the projection is less than an internal width of the anti-rotation member.

16. The fastening structure according to claim 11, wherein the one member or the anti-rotation member includes an engaging portion, located between the one member and the anti-rotation member, that is formed stepwise so as to be narrowed toward an end in a rotation-axis direction.

17. The fastening structure according to claim 11, wherein the projection is formed tapered so as to be narrowed toward an end in a rotation-axis direction.

* * * * *